US010113869B2

United States Patent
Sasaki

(10) Patent No.: US 10,113,869 B2
(45) Date of Patent: Oct. 30, 2018

(54) DEVICE FOR IDENTIFYING CHANGE IN VERTICAL DIRECTION BY USING AIR PRESSURE MEASUREMENT VALUE

(71) Applicant: ASAHI KASEI KABUSHIKI KAISHA, Tokyo (JP)

(72) Inventor: Hiroyuki Sasaki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 265 days.

(21) Appl. No.: 14/892,337

(22) PCT Filed: May 23, 2014

(86) PCT No.: PCT/JP2014/002729
§ 371 (c)(1),
(2) Date: Nov. 19, 2015

(87) PCT Pub. No.: WO2014/192271
PCT Pub. Date: Dec. 4, 2014

(65) Prior Publication Data
US 2016/0091309 A1 Mar. 31, 2016

(30) Foreign Application Priority Data
May 31, 2013 (JP) ................................. 2013-115458

(51) Int. Cl.
*G01C 21/00* (2006.01)
*G08G 1/123* (2006.01)
(Continued)

(52) U.S. Cl.
CPC ............... *G01C 5/06* (2013.01); *G01C 21/04* (2013.01); *G01P 3/62* (2013.01)

(58) Field of Classification Search
CPC .................................... G01C 5/06; G01P 3/62
(Continued)

(56) References Cited

U.S. PATENT DOCUMENTS 5,058,427 A * 10/1991 Brandt ..................... G01C 5/06
340/977
8,180,591 B2 * 5/2012 Yuen et al. .......... A61B 5/0002
702/160
(Continued)

FOREIGN PATENT DOCUMENTS

DE 10 2009 002 314 A1 7/2010
JP 03-051709 A 3/1991
(Continued)

OTHER PUBLICATIONS

Authors: Yasuaki Ohtaki, Mitsutoshi Susumago, Akihiro Suzuk, Koichi Sagawa, Ryoichi Nagatomi and Hikaru Inooka, Title: Automatic classification of ambulatory movements and evaluation of energy consumptions utilizing accelerometers and a barometer, Date: Aug. 10, 2005, Publisher: Springer-Verlag, Microsyst Technol, 11: pp. 1034-1040.*

(Continued)

*Primary Examiner* — Lisa Caputo
*Assistant Examiner* — Roger Hernandez-Prewit
(74) *Attorney, Agent, or Firm* — Morgan, Lewis & Bockius LLP

(57) ABSTRACT

An identifying device includes a vertical direction speed calculation unit configured to calculate a speed in a vertical direction of an air pressure measurement unit from an air pressure value measured by the air pressure measurement unit, the vertical direction speed determination unit configured to determine a magnitude of the speed in the vertical direction, a vertical direction continuous distance calculation unit configured to calculate a continuous distance of movement in the vertical direction based on the speed in the vertical direction calculated by the vertical direction speed calculation unit and the determination result of the vertical direction speed determination unit, and a vertical direction movement determination unit configured to determining (Continued)

whether the air pressure measurement unit is moving in the vertical direction or not in accordance with whether or not the vertical direction continuous distance is more than a predetermined threshold value.

14 Claims, 6 Drawing Sheets

(51) Int. Cl.
*G01C 5/06* (2006.01)
*G01C 21/04* (2006.01)
*G01P 3/62* (2006.01)

(58) Field of Classification Search
USPC ............ 73/384–387; 342/120, 123; 702/160, 702/166; 701/454
See application file for complete search history.

(56) References Cited

U.S. PATENT DOCUMENTS

| | | |
|---|---|---|
| 2002/0032539 A1 | 3/2002 | Tsuji |
| 2003/0018430 A1* | 1/2003 | Ladetto et al. ........ G01C 21/16 701/472 |
| 2007/0067137 A1* | 3/2007 | Ohkubo et al. ........ G01C 21/28 702/142 |
| 2007/0072158 A1 | 3/2007 | Unuma et al. |
| 2007/0218823 A1 | 9/2007 | Wolf |
| 2009/0217754 A1* | 9/2009 | Binda et al. ............. G01C 5/06 73/384 |
| 2014/0128093 A1* | 5/2014 | Das et al. ........... H04W 64/006 455/456.1 |

FOREIGN PATENT DOCUMENTS

| | | |
|---|---|---|
| JP | 06-501553 A | 2/1994 |
| JP | 2001-289632 A | 10/2001 |
| JP | 2007-093433 A | 4/2007 |
| JP | 2009-530647 A | 8/2009 |
| JP | 2009-282930 A | 12/2009 |
| JP | 2009-287984 A | 12/2009 |
| JP | 2012-068122 A | 4/2012 |
| JP | 2012-237719 A | 12/2012 |

OTHER PUBLICATIONS

Authors: J. Parviainen, J. Kantola and J. Collin, Title: Differential Barometry in Personal Navigation, Date: Mar. 2008, Publisher: IEEE, pp. 148-152.*

Authors: Koichi Sagawa, Tadashi Ishihara, Atsushi Ina and Hikaru Inooka, Title: Classification of Human Moving Patterns Using Air Pressure and Acceleration, Date: Jul. 1998, Publisher: IEEE, pp. 1214-1219.*

International Search Report dated Aug. 19, 2014 for corresponding International application No. PCT/JP2014/002729.

International Preliminary Report on Patentability dated Dec. 10, 2015, for International application No. PCT/JP2014/002729, 5 pages.

Partial European Search Report dated Nov. 3, 2016, for corresponding European Patent Application No. 14804356.5 , 7 pages.

Extended European Search Report dated Feb. 21, 2017, for corresponding European Patent Application No. 14804356.5 , 12 pages.

* cited by examiner

| TIME | t-T | ..... | t-1 | t |
|---|---|---|---|---|
| AIR PRESSURE | P(t-T) | ..... | P(t-1) | P(t) |
| HEIGHT IN VERTICAL DIRECTION | H(t-T) | ..... | H(t-1) | H(t) |
| CALCULATE INCLINATION OF LEAST SQUARES APPROXIMATION STRAIGHT LINE | | | | |
| SPEED IN VERTICAL DIRECTION | V(t) | | | |

DEVICE FOR IDENTIFYING CHANGE IN VERTICAL DIRECTION BY USING AIR PRESSURE MEASUREMENT VALUE

TECHNICAL FIELD

The present invention relates to a device for identifying a change in a vertical direction by using an air pressure measurement value.

BACKGROUND ART

In the past, a method for measuring the elevation or the altitude (the height in the vertical direction from 0 meter above sea level) with an air pressure-type altimeter is known. For example, this measurement technique may be used on the ground such as a current location elevation measurement during mountain climbing, or may be used in the air very much away from the ground in the earth's atmosphere such as the altimeter measurement provided in an aircraft.

This air pressure-type altimeter measures on the basis of the following principle.

More specifically, the air existing at any given portion on the earth receives, from the upper side of the air in the vertical direction (the sky), a force corresponding to the weight of the air located in the sky portion due to the gravity (the force of gravity) of the earth. Therefore, the amount of air or the air density is always higher (larger) at the side of the surface of the earth than at the side of the sky, and as a result, the pressure of the air, i.e, the air pressure, is always higher at the side of the surface of the earth than at the side of the sky. If the air is considered to be ideal gas, it is a well-known theory of fluid dynamics that the air pressure exponentially decreases toward the sky (as the altitude becomes higher).

On the other hand, for the measurement of the air pressure with this air pressure-type altimeter, a sensor called an absolute pressure sensor is used in many cases in general.

This absolute pressure sensor is a sensor capable of measuring the air pressure in the earth's atmosphere relative to the vacuum (zero air pressure or zero hectopascal). The change in the air pressure which is commonly referred to as a high atmospheric pressure and a low atmospheric pressure serves as an important index on the basis of a change of the weather, or an important index for predicting the change in the weather from the change in the air pressure in a reverse manner. What measures the air pressure serving as the index is the absolute pressure sensor, and a similar sensor is also used in the air pressure-type altimeter.

However, the air pressure-type altimeter involves the following fundamental problems. That is, the physical amount to be measured is not the altitude itself, and is the air pressure, and therefore, even in a case where the air pressure changes due to a reason other than the altitude, the altitude is deemed to have changed. For this reason, an error occurs between the actual altitude and the current altitude held by the air pressure-type altimeter.

In this case, the factors other than the altitude are, more specifically, the high atmospheric pressure and the low atmospheric pressure explained above, a change in the air pressure due to the flow of the air (wind), or a change in the air pressure that occurs at a border of two or more closed spaces.

For example, in a case where it is necessary to overcome this problem during mountain climbing and correct the altitude, the changes of the altitude and the air pressure in the mountain climbing are often relatively slow, and therefore, it is important to distinguish these changes from the change in the air pressure caused by weather conditions such as the high atmospheric pressure, the low atmospheric pressure, and the like of which changes of the air pressure are likewise relatively slow.

In the actual operation, for example, two types of measures are considered.

The first measure is that, in a case where the elevation is written on a mountain climbing signpost, the mountain climber performs operation to correct the altitude of the altimeter at that location. That is, in this first measure, the mountain climber manually corrects the altitude.

The second measure is that the elevation is found by a three-dimensional measurement of a GPS receiver, and the altitude of the altimeter is corrected at that location. In this second measure, the altitude correction may be automatically executed, or may be manually executed.

On the other hand, in recent years, many buildings called a high building or a super high building are constructed in urban areas in particular, and a person frequently wants to find "the floor in which the person is now located".

In such situation of the inside of the building, the measurement based on the GPS receiver cannot be performed because the radio wave does not reach the GPS receiver, and instead, it is common to use a barometer (air pressure-type altimeter). Even in a case of movement in the inside of the building, and the air pressure changes due to a factor other than the altitude, there would be an error between the current altitude held in the air pressure-type altimeter and the actual altitude if the altitude is deemed to have changed. For this reason, in the barometer (air pressure-type altimeter), it is desired to provide a method for accurately identifying whether the air pressure has changed due to the change in the altitude or the air pressure has changed due to a factor other than the altitude.

In this case, in a case of movement in the inside of the building, the change in the altitude and the air pressure is often relatively fast (when the change occurs) unlike the case of the mountain climbing explained above. The reason for this is that elevators, escalators, stairs, and the like are generally used to move in the altitude direction of the building, that is, in the vertical direction.

In such case, rather than distinguishing the change in the air pressure caused by the change in the altitude due to the movement from the high atmospheric pressure and the low atmospheric pressure, it is more important to distinguish the change in the altitude and air pressure caused by movement to the upper floor or the lower floor in the inside of the building from the change in the air pressure caused by the flow of the air (wind) or the change in the air pressure that occurs at a border of spaces.

For example, the following technique is known as a technique for distinguishing whether the change in the air pressure is caused by the change of the altitude or the movement in the vertical direction or is caused by the change other than the altitude such as the flow of the air (wind).

PTL 1 discloses a technique in which the altitude and the amount of the change in the altitude are calculated on the basis of the measurement value of a pressure sensor, and when the amount of the change of the altitude is less than a predetermined threshold value, "stationary" is determined. Further, a threshold value larger than the predetermined threshold value is set, and when the amount of the change of the altitude is more than the larger threshold value, "moving" is determined.

PTL 2 discloses a technique in which a movement state such as a stop of elevator movement is determined on the basis of measurement results of the acceleration and the air pressure, the elevator movement stop point is caused to match the layout data stored beforehand.

PTL 3 discloses a technique in which movement in the vertical direction is detected by using a motion sensor other than the pressure sensor, and the altitude is adjusted on the basis of the detection result.

PTL 4 discloses a technique in which the air pressure change speed is calculated from the measurement value of an air pressure sensor, and a probability distribution obtained from a distribution and an average value based on an air pressure change speed stored for each descend and ascend state beforehand and the speed are compared, and the descend and ascend state with the highest probability value is selected.

CITATION LIST

Patent Literature

PTL 1: JP 2001-289632 A
PTL 2: JP 2009-287984 A
PTL 3: JP 2009-530647 A
PTL 4: JP 2012-237719 A

SUMMARY OF INVENTION

According to one embodiment of the present invention, there is provided a device for identifying a change in a vertical direction by using an air pressure measurement value, the device including: an air pressure measurement unit configured to measure an air pressure; a speed calculation unit configured to calculate a speed in a vertical direction of the air pressure measurement unit based on an air pressure measurement value measured by the air pressure measurement unit; a continuous movement distance calculation unit configured to calculate a continuous movement distance in the vertical direction of the air pressure measurement unit based on the speed in the vertical direction obtained by the speed calculation unit; and a vertical direction movement determination unit configured to determine that the air pressure measurement unit moves in the vertical direction based on the speed in the vertical direction and the continuous movement distance calculated by the continuous movement distance calculation unit.

According to another embodiment of the present invention, there is provided an air pressure-type vertical direction movement identifying device including: an air pressure sensor configured to output an air pressure signal; a vertical direction speed signal output unit configured to input the air pressure signal, and to output a first signal indicating a speed in a vertical direction of the air pressure sensor; a vertical direction movement distance signal output unit configured to input the first signal, and to output a second signal indicating a vertical direction movement distance of the air pressure sensor; and a vertical direction movement signal output unit configured to input the first signal and the second signal, and to output a third signal indicating that the air pressure sensor moves in the vertical direction.

DESCRIPTION OF EMBODIMENTS

Figure 1:
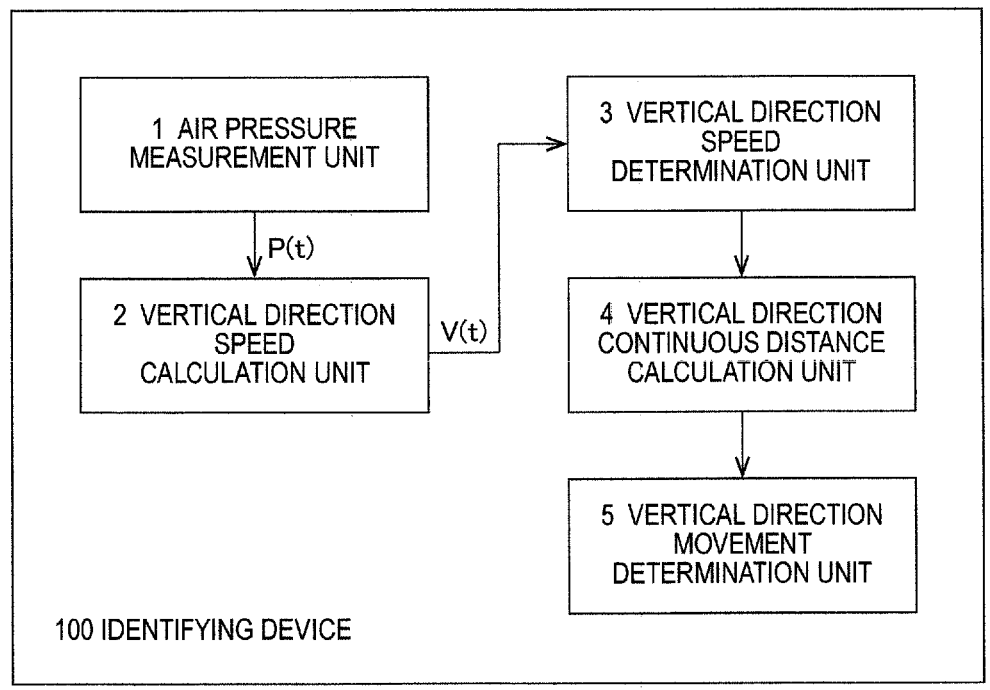
FIG. 1 is a block diagram illustrating an example of a configuration of an identifying device according to the present invention.

In the technique described in PTL 1, only the (absolute) amount of the change of the air pressure is calculated, and the change of the air pressure over time is not calculated. As described above, unless the time is considered, it is basically impossible to distinguish the change in the air pressure due to movement in the vertical direction from the high atmospheric pressure and the low atmospheric pressure or the change in the air pressure caused due to the flow of the air (wind) or the border of spaces.

Subsequently, in the technique of PTL 2, the stop point of the elevator movement must be obtained on the basis of the measurement result of the acceleration and the air pressure, but PTL 2 is completely silent on a specific method for obtaining them.

Likewise, the technique of PTL 3 is also completely silent on how to detect the movement in the vertical direction by using the motion sensor in a specific manner.

Further, in the technique of PTL 4, the descend and ascend state of, e.g., elevators, escalators or stairs, is determined when the air pressure change is detected, and the detection of the air pressure change can be calculated in accordance with a method similar to PTL 1, that is, calculated as the difference of the air pressure (as the absolute value). Therefore, the technical level for identifying whether the change in the air pressure is the change in the altitude or caused by movement in the vertical direction would have to be said to be the same as PTL 1.

In PTL 4, the reason why the descend and ascend state of the elevator and the escalator or the stairs can be identified is because, in general, the speed of the elevator in the vertical direction and the speed of the escalator and the stairs in the vertical direction are greatly different. When this is explained in a more specific manner using figures, the average speed of an elevator in the vertical direction is 4.0 m/s (except during acceleration and deceleration). On the other hand, both of the speeds of the escalator and the stairs in the vertical direction are almost about the same level, and the average is 0.25 m/s. Further, a movement at the same altitude or the average in a stationary state is, of course, 0 m/s. In view of this numerical value, it is easy to distinguish the elevator from the escalator and the stairs which was the problem of PTL 4, and it is evident that it is rather difficult to distinguish the escalator and the stairs from the movement in the same altitude and the stationary state, that is, it is rather difficult to determine whether or not the change in the air pressure is due to the change in the altitude or the movement in the vertical direction.

Further, two problems which are not clearly shown in the conventional techniques will be shown.

The first problem is that the speeds of the escalator and the stairs in the vertical direction are extremely slow. When 0.25 m/s, which is the speeds of the escalator and the stairs in the vertical direction, is expressed as the time change rate of the air pressure, 0.25 m/s corresponds to about 0.03 hPa/s. This value is a natural phenomenon that would be easily generated by the flow of air and the wind even if there is no change in the altitude or no movement in the vertical direction within an instantaneous period of time such as one to several seconds. Therefore, in order to identify whether or not the change in the air pressure is caused by the change in the altitude or the movement in the vertical direction, it is necessary to provide a new technique for distinguishing them both from each other (the escalator and the stairs, and the flow of the air or the wind).

The second problem is that the speeds of the elevator, the escalator, and the stairs in the vertical direction greatly vary depending on buildings or equipment. For example, the average speed of the elevator in the vertical direction is 4.0 m/s, but the speeds in the vertical direction in medical facilities (hospitals and the like) and cargo transport elevators are greatly lower than that. On the other hand, the speed in the super high building in the vertical direction is extremely fast. Furthermore, every elevator always becomes 0 m/s at the floor where the elevator stops, and therefore, when the elevator approaches the floor to stop, the speed of the elevator becomes as close as 0 m/s as possible. As far as these are concerned, it would have to be said to be extremely difficult to determine whether the change in the air pressure is due to the change in the altitude or the movement in the vertical direction by just using the speed in the vertical direction.

Therefore, the present embodiment is made in view of such circumstances, and an emphasis is placed on accurately and automatically identifying whether a change in the air pressure is caused by a change in the altitude due to movement of a moving object or not, and it is an object of the present invention to provide a device for identifying a change in the vertical direction by using an air pressure measurement value capable of achieving this by using a new determining method without relying only on the speed in the vertical direction.

According to one embodiment of the present invention, there is provided a device for identifying a change in a vertical direction by using an air pressure measurement value, the device including: an air pressure measurement unit configured to measure an air pressure; a speed calculation unit configured to calculate a speed in a vertical direction of the air pressure measurement unit based on an air pressure measurement value measured by the air pressure measurement unit; a continuous movement distance calculation unit configured to calculate a continuous movement distance in the vertical direction of the air pressure measurement unit based on the speed in the vertical direction obtained by the speed calculation unit; and a vertical direction movement determination unit configured to determine that the air pressure measurement unit moves in the vertical direction based on the speed in the vertical direction and the continuous movement distance calculated by the continuous movement distance calculation unit.

The device may include a vertical direction speed determination unit configured to determine whether or not the speed in the vertical direction is more than a speed threshold value which is set beforehand. The vertical direction movement determination unit may be configured to determine that the air pressure measurement unit moves in the vertical direction when the vertical direction speed determination unit determines that the absolute value of the speed in the vertical direction is more than the speed threshold value and the absolute value of the continuous movement distance calculated by the continuous movement distance calculation unit is more than a movement distance threshold value which is set beforehand. The vertical direction movement determination unit may be configured not to determine that the air pressure measurement unit moves in the vertical direction when the vertical direction speed determination unit determines that the absolute value of the speed in the vertical direction is more than the speed threshold value and the absolute value of the continuous movement distance is not more than the movement distance threshold value.

The vertical direction movement determination unit may be configured to determine that the air pressure measurement unit is not moving in the vertical direction when it is determined that the absolute value of the speed in the vertical direction is more than the speed threshold value and the absolute value of the continuous movement distance is not more than the movement distance threshold value.

The vertical direction movement determination unit may be configured to determine whether or not the air pressure measurement unit moves in the vertical direction based on the speed in the vertical direction and the continuous movement distance.

The device may include a vertical direction speed determination unit configured to determine whether or not the speed in the vertical direction is more than a speed threshold value which is set beforehand. The vertical direction movement determination unit may be configured to determine that the air pressure measurement unit moves in the vertical direction when the vertical direction speed determination unit determines that the absolute value of the speed in the vertical direction is more than the speed threshold value and the absolute value of the continuous movement distance calculated by the continuous movement distance calculation unit is more than a movement distance threshold value which is set beforehand. The vertical direction movement determination unit may be configured to determine that the air pressure measurement unit does not move in the vertical direction when the vertical direction speed determination unit determines that the absolute value of the speed in the vertical direction is more than the speed threshold value and the absolute value of the continuous movement distance is not more than the movement distance threshold value.

The continuous movement distance calculation unit may be configured to calculate the continuous movement distance by integrating movement amounts of the air pressure measurement unit per unit time based on the speed in the vertical direction while the absolute value of the speed in the vertical direction is more than the speed threshold value, and to reset the continuous movement distance is reset to zero while the absolute value of the speed in the vertical direction is not more than the speed threshold value.

The device may further include an altitude calculation unit configured to perform altitude calculation based on the air pressure measurement value; and a storage unit in which a reference air pressure at a predetermined altitude or floor used when the altitude calculation unit performs the altitude calculation is stored. The reference air pressure stored in the storage unit may be corrected based on the air pressure measurement value while the air pressure measurement unit is determined not to be moving in the vertical direction.

It may be identified which of an elevator, an escalator, or stairs is moving equipment used to move the air pressure measurement unit based on the speed in the vertical direction, while the vertical direction movement determination unit determines that the air pressure measurement unit is moving in the vertical direction.

The device may further include an acceleration meter configured to measure an acceleration in the vertical direction. While the vertical direction movement determination unit determines the moving equipment used to move the air pressure measurement unit is an escalator or stairs, it may be identified which of a state of walking on a moving escalator, a state of being stationary on a moving escalator, and a state of descending or ascending stairs, the user holding the air pressure measurement unit is in, based on the speed in the vertical direction and the acceleration measured by the acceleration meter.

The device may further include a stairs movement identifying unit configured to identify that the user is in a stationary state on a moving escalator when the user is determined not to be in a walking state based on the acceleration measured by the acceleration meter, and to subtract from the absolute value of the speed in the vertical direction calculated by the speed calculation unit, the absolute value of a predetermined walking speed in the vertical direction corresponding to a speed in the vertical direction that is caused in a case where the user walks on an escalator or descends or ascends stairs when the user is determined to be in a walking state based on the acceleration. The stairs movement identifying unit may be configured to identify that the user is in a state of walking on a moving escalator when a subtraction result obtained by subtracting the absolute value of the walking speed in the vertical direction from the absolute value of the speed in the vertical direction is more than a threshold value which is set beforehand, and to identify that the user is descending or ascending stairs, when the subtraction result is equal to or less than the threshold value.

The device may further include a floor map display unit configured to display a floor map of a floor where the user is located. The floor map display unit may be configured to coordinate a current location of the user with a location of the moving equipment on the floor map, which is one of an elevator, an escalator, and stairs, that is identified to be used to move by the user, or to coordinate a movement direction of the user with the location of the moving equipment on the floor map.

According to another embodiment of the present invention, there is provided an air pressure-type vertical direction movement identifying device including: an air pressure sensor configured to output an air pressure signal; a vertical direction speed signal output unit configured to input the air pressure signal, and to output a first signal indicating a speed in a vertical direction of the air pressure sensor; a vertical direction movement distance signal output unit configured to input the first signal, and to output a second signal indicating a vertical direction movement distance of the air pressure sensor; and a vertical direction movement signal output unit configured to input the first signal and the second signal, and to output a third signal indicating that the air pressure sensor moves in the vertical direction.

The third signal may indicate that moving equipment used to move the air pressure sensor is an escalator or stairs.

The vertical direction movement signal output unit may be configured to further output a fourth signal indicating that the moving equipment is an elevator.

According to still another embodiment of the present invention, there is provided a floor map display device including: the air pressure-type vertical direction movement determine device according to the above-described embodiment; and a floor map display unit configured to display a floor map of a floor where a user is located, based on the third signal and the fourth signal.

The floor map display unit may be configured to coordinate a current location of the user with a location of the moving equipment on the floor map, which is one of the elevator, the escalator, and the stairs, that is determined to be used to move by the user, or to coordinate a movement direction of the user with the location of the moving equipment on the floor map.

An embodiment of the present invention will now be described with reference to the drawings.
(Configuration of Embodiment)

FIG. 1 is a block diagram illustrating an example of a configuration of an identifying device 100 for identifying a change in the vertical direction by using a barometer according to the present invention.

The identifying device 100 as shown in FIG. 1 includes an air pressure measurement unit 1, a vertical direction speed calculation unit 2, a vertical direction speed determination unit 3, a vertical direction continuous distance calculation unit 4, and a vertical direction movement determination unit 5.

The air pressure measurement unit 1 is a block for measuring the air pressure (atmospheric pressure) by using an absolute pressure sensor and the like. The air pressure measurement unit 1 is not particularly limited to an absolute pressure sensor as long as it is capable of measuring the air pressure, and for example, measurement can be performed by using a barometer called a mercury type or an aneroid type.

The vertical direction speed calculation unit (corresponding to the speed calculation unit) 2 is a block for calculating the movement speed in the vertical direction (corresponding to the speed in the vertical direction) from the air pressure value measured by the air pressure measurement unit 1.

There are many types of various calculation methods for this, but the most clear and accurate method is a method in which, first, the air pressure value is converted into the height in the vertical direction (hereinafter referred to as the vertical direction height), and subsequently, a time change rate of the vertical direction height is derived.

A subsequently effective method is a method in which the time change rate of the measured air pressure value is derived, and the change rate is converted into the speed of the movement in the vertical direction. For the sake of convenience, the former method is assumed to be employed in the following explanation.

In the case of the present invention, in any of the two types of methods explained above, an inclination value of a least squares approximation straight line with respect to the air pressure value or the vertical direction height value obtained in a time zone from the current point in time to several seconds before is preferably adopted as a time change rate. Therefore, the measurement cycle is recommended to be one second or a period of time shorter than about one second (100 millisecond to approximately several hundred milliseconds). It should be noted that, as can be easily understood, it is indicated that, if the measurement cycle is not discrete but is continuous and the differential calculation is used as the time change rate, the calculation results of the above two types of methods are completely the same.

The vertical direction speed determination unit 3 is a block for determining the magnitude of the speed in the vertical direction calculated by the vertical direction speed calculation unit 2. The details of this block will be explained later together with an example of specific data and calculation method.

The vertical direction continuous distance calculation unit (corresponding to the continuous movement distance calculation unit) 4 is a block for calculating over how much distance the continuous movement in the vertical direction is made, from the results obtained from the vertical direction speed calculation unit 2 and the vertical direction speed determination unit 3. Likewise, the details of this block will also be explained later.

The vertical direction movement determination unit 5 is a block for determining (the magnitude of) the continuous movement distance in the vertical direction obtained from the vertical direction continuous distance calculation unit 4. Likewise, the details of this block will also be explained later.

Subsequently, a specific example of calculation method according to the present invention will be shown.

Figure 2:
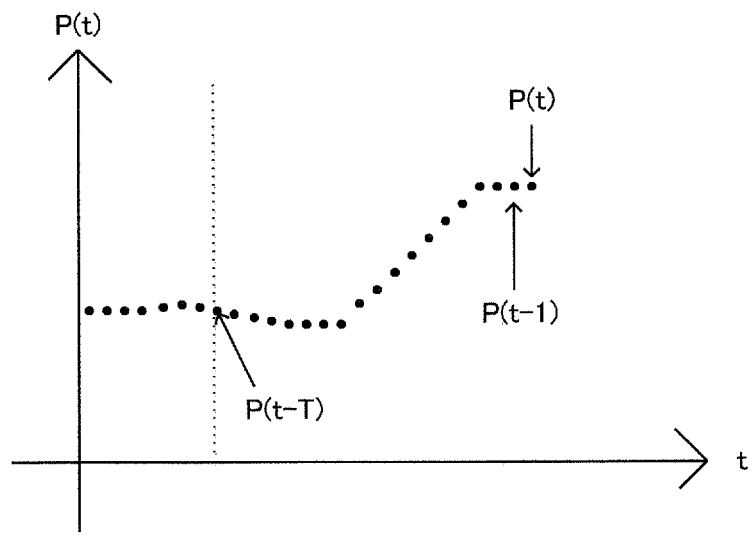
FIG. 2 is a graph illustrating an example of air pressure value data.

FIG. 2 is a graph illustrating, as a function of a time t, an air pressure value measured by the air pressure measurement unit 1. In FIG. 2, the horizontal axis is the time t, and the vertical axis is the air pressure value P (t), and the current time is denoted as t, and the air pressure value at that point in time denoted as P (t). The air pressure value is assumed to be measured in a discrete manner, and a time earlier than the current time by one is defined as "t−1", and the air pressure value at that point in time is define as P (t−1). Likewise, the earliest time in the past used for deriving the inclination of the least approximation straight line (indicated as a vertical broken line in FIG. 2) is denoted as "t−T", and the air pressure value at that point in time is denoted as P (t−T).

Figures 3, 4:
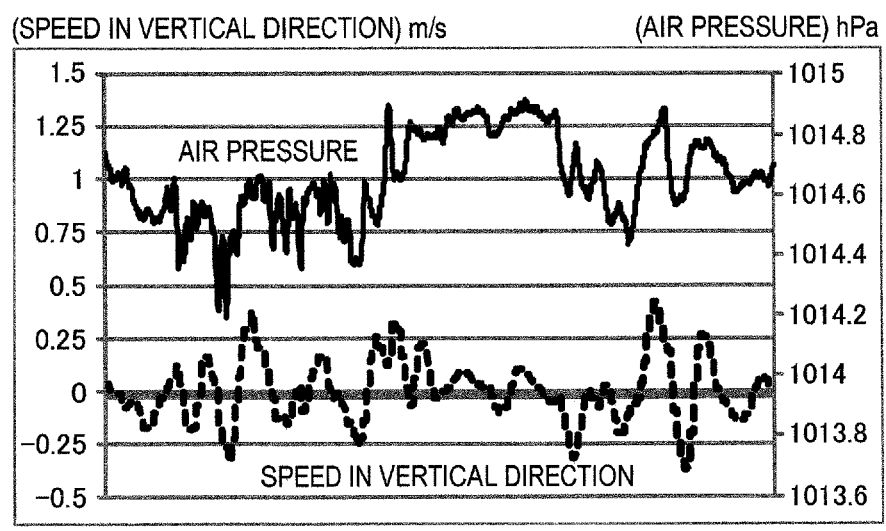
FIG. 3 is a table illustrating a conversion example of various kinds of data used in the identifying device.
FIG. 4 is a graph illustrating an actual measurement example of air pressure value data.

As shown in FIG. 3, the air pressure values P (t−T) to P (t) obtained in FIG. 2 are converted into the vertical direction height. Where the vertical direction height is denoted as H (t−T) to H (t), it is known that the following expression is satisfied between the air pressure value P (i) and the vertical direction height H (i).

$$H(i) = -Psens * P0 * \log e(P(i)/Pref)$$

(where i is t−T to t)

In this expression, "Psens" denotes a transformation coefficient of the air pressure and the vertical direction height. "P0" denotes a reference air pressure value at 0 meter above sea level of the international standard atmosphere, and P0 is 1013.25 hPa. Further, "Pref" is the air pressure value at the reference of the vertical direction height, and "Pref" may be any value other than 0 hPa in the present invention, but it would most clearly indicate the physical meaning when Pref is defined as P (t−T). Therefore, how much pressure has been changed in the time (from the start to the end) in which the inclination of this least approximation straight line is derived.

Thereafter, instead of the air pressure value P (t−T) to P (t), the vertical direction height H (t−T) to H (t) calculated from this relational expression is adopted as a dependent variable, and by using the time "t−T" to t as the independent variable, and the least method is applied thereto, and the inclination of the approximation straight line is derived, so that the speed in the vertical direction V(t) at the time t can be calculated. As can be easily understood, the speed in the vertical direction V(t) corresponds to the average movement speed in the vertical direction in the time "t−T" to t.

The above series of processing explained above is executed by the vertical direction speed calculation unit 2.

The magnitude of the speed in the vertical direction V(t) obtained as described above is determined by the vertical direction speed determination unit 3. More specifically, it is identified which of the following states the speed in the vertical direction V(t) is applicable to.

In this case, when moving in moving equipment in the vertical direction (elevators, escalators, stairs) or the like in an actual high building, the speed in the vertical direction V(t) can be associated as shown in the following (1) to (6) on the basis of the magnitude (absolute value) thereof and the direction (positive/negative sign).

Elevator ascend: $V(t) \geq Vth2$ (1)

Elevator descend: $V(t) \leq -Vth2$ (2)

Escalator ascend: $Vth1 < V(t) < Vth2$ (3)

Escalator descend: $-Vth2 < V(t) < -Vth1$ (4)

Stair ascend: $Vth1 < V(t) < Vth2$ (5)

Stair descend: $-Vth2 < V(t) < -Vth1$ (6)

In this case, both of Vth1 and Vth2 are positive predetermined values, and satisfies the magnitude relationship of $0 < Vth1 < Vth2$. These are values having the meaning of the threshold values for identifying the magnitude of the speed in the vertical direction. It should be noted that Vth1 corresponds to the speed threshold value.

On the other hand, the speed in the vertical direction V(t) can be associated as shown in the following (7) and (8) when a person does not move with the moving equipment in the vertical direction such as an elevator, an escalator, or stairs, but the person walks on a flat floor surface (which will be hereinafter referred to as flat walking), or when the person stays at the same place (which will be hereinafter referred to as stationary).

Flat walking: $-Vth1 \leq V(t) \leq Vth1$ (7)

Stationary: $-Vth1 \leq V(t) \leq Vth1$ (8)

However, as described at the beginning, the movement with an elevator and the movement with an escalator and stairs can be distinguished to some extent from the magnitude of the speed in the vertical direction V(t), but the movement with the escalator and the stairs and the movement with the flat walking and the stationary state are difficult to be distinguished from the speed in the vertical direction V(t).

The specific example in which it is difficult to distinguish will be explained by showing the actual air pressure value data.

FIG. 4 is a graph illustrating changes in the air pressure value data that actually measured when a user holding the air pressure measurement unit 1 is stationary on the first floor (vaulted floor) in the indoor, and the speed in the vertical direction calculated from the air pressure value data in accordance with the above method.

In FIG. 4, a solid line denotes the air pressure value P (t), and a broken line denotes the speed in the vertical direction V(t). The horizontal axis denotes a time, and the time from the left end to the right end in this graph is four minutes, and the measurement cycle is 100 millisecond. Therefore, since there are 2400 measurement points, they appear to be continuous functions when shown in the drawing, but in reality, they are discrete numerical sequence.

On the other hand, the vertical axis illustrate the air pressure value (1013.6 to 1015.0 hPa) and the speed in the vertical direction (−0.5 to +1.5 m/s). The value of Psens in this example is 8.7 m/hPa. This is close to the value of Psens under the environment in which the temperature is 25 degrees Celsius and the humidity is 50% RH.

When the graph of FIG. 4 is further analyzed into details, it is understood that the air pressure fluctuates between about 1014.2 hPa and 1014.9 hPa in four minutes. This fluctuation is a natural phenomenon that can easily occur by the flow of the air and the wind even if there is no change in the altitude or the movement in the vertical direction. That is, this is a phenomenon that could easily occur even in a case of the flat walking and stationary state.

The difference 0.7 hPa of the fluctuation almost corresponds to about 5 to 6 m in the vertical direction height. This is a fluctuation motion of 4 m or more which is the average floor height (floor height means the height of each floor) of the building. The speed in the vertical direction may attain 0.25 m/s which is the ascend-descend average speed of the escalator and the stairs in both of the upward and downward directions (the positive and the negative of the sign). In the conventional technique explained above, only this speed in the vertical direction is used, and therefore, there may be a situation in which the escalator and the stairs cannot be distinguished from the flat walking and the stationary state with these air pressure data (it should be noted that the elevator is much faster, i.e., 4.0 m/s, and therefore the elevator can be distinguished).

However, as can be seen from FIG. 4, in a case where the user who is holding the air pressure measurement unit 1 is at a stationary state, the speed in the vertical direction may attain ±0.25 m/s in some cases, but the speed in the vertical direction continues only for a short period of time. When this special occasion is applied to a general occasion, this can be said as follows.

That is, although the instantaneous value of the air pressure surely changes even in the stationary state, it fluctuates around the average value with a cycle of as long as several seconds, and in addition, the magnitude of the fluctuation has a significant magnitude that cannot be disregarded when compared with the change in the altitude. For this reason, it is not possible to identify the flat walking and the stationary state with only the speed in the vertical direction.

On the other hand, in a case where the user who holds the air pressure measurement unit 1 moves between floors on the escalator, the speed in the vertical direction is small, i.e., 0.25 m/s, but the speed in the vertical direction continues for a longer period of time. For example, when a person moves between floors where the floor height is 4 m, it takes 16 seconds. By utilizing the time difference between this 16 seconds and the cycle of several seconds explained above, it is possible to distinguish the movement with the escalator or the stairs from a simple fluctuation of the air pressure (the flat walking or the stationary state). The block for making such a discrimination is the vertical direction continuous distance calculation unit 4 and the vertical direction movement determination unit 5. Hereinafter, the details of these two blocks will be explained.

Figure 5:
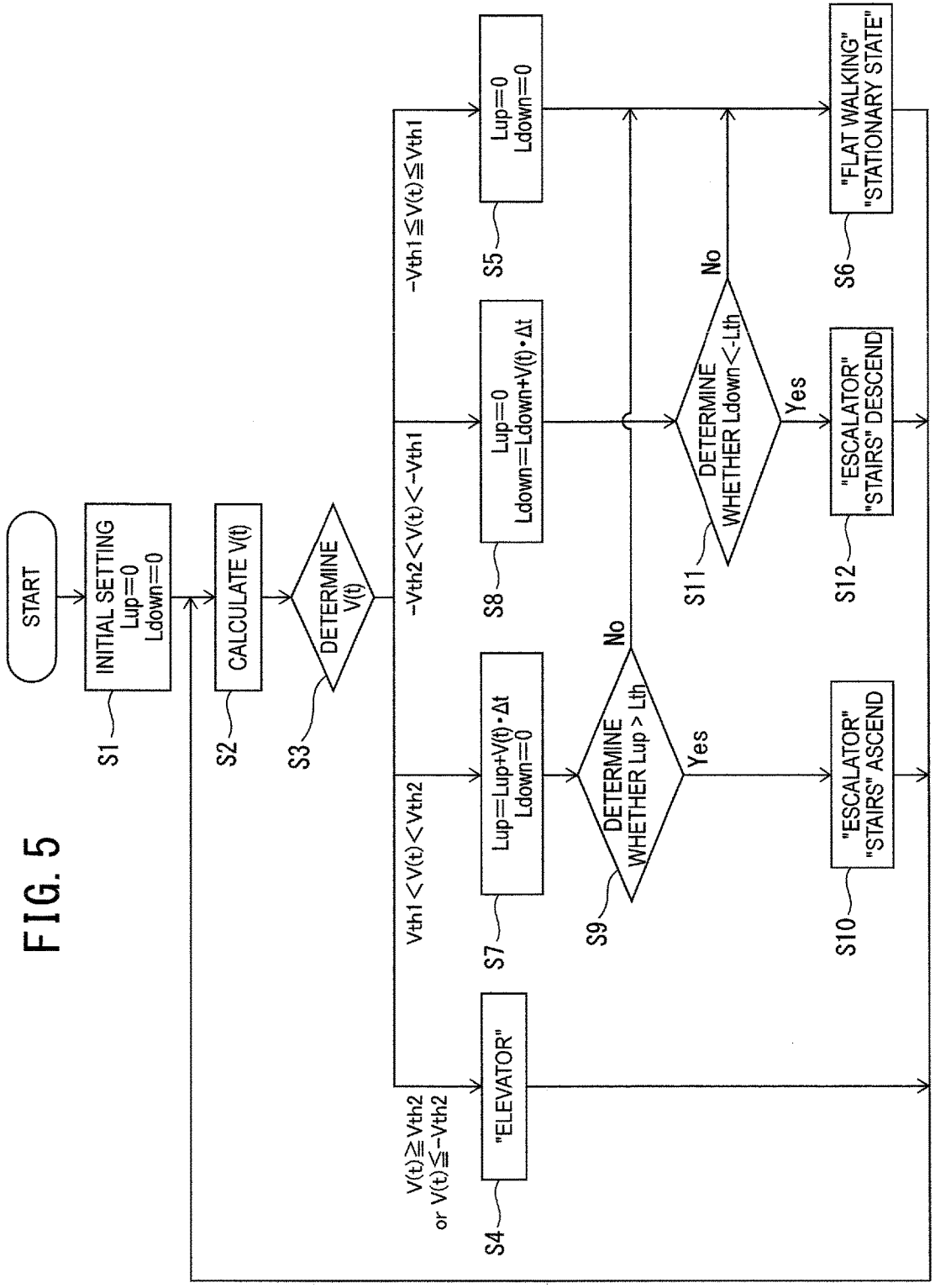
FIG. 5 is an example of a flowchart illustrating the details of processing procedure of main blocks of the identifying device.

FIG. 5 is a drawing showing, on a flowchart, operation of the vertical direction speed determination unit 3, the vertical direction continuous distance calculation unit 4, and the vertical direction movement determination unit 5.

The variables in FIG. 5 are only two variables which are Lup and Ldown. In the initial setting, first, the variables Lup and Ldown are cleared (Lup=0, Ldown=0) (step S1).

Subsequently, the speed in the vertical direction V(t) at the time t is calculated (step S2). More specifically, on the basis of the air pressure value data obtained by the air pressure measurement unit 1, for example, the speed in the vertical direction V(t) can be calculated in accordance with the above calculation method from the inclination value and the like of the least squares approximation straight line of the air pressure value data for a predetermined period of time. Then, the magnitude of the speed in the vertical direction V(t) is determined, That is, the magnitude of the speed in the vertical direction V(t) is identified (step S3).

In the explanation about FIG. 5, it is identified which of the four kinds of states, i.e., an ascend or descend on an "elevator", an ascend on an "escalator" or "stairs", a descend on an "escalator" or "stairs", and a "flat walking" or "stationary state", the user who holds the air pressure measurement unit 1 is in. It should be noted that the determination of the speed in the vertical direction V(t) referred to herein means that identifying as to which of the four kinds of states the calculated speed in the vertical direction V(t) corresponds to.

The determination of the speed in the vertical direction V(t) is performed in accordance with the following procedure.

First, in a case where the absolute value of the speed in the vertical direction V(t) is large, that is, in a case where the speed in the vertical direction is extremely fast, the user who holds the air pressure measurement unit 1 is considered to be moving in the elevator (step S4). When this is expressed in a numerical expression, the definition can be made as shown in the following (1) and (2) as explained above.

$$\text{Elevator ascend: } V(t) \geq Vth2 \quad (1)$$

$$\text{Elevator descend: } V(t) \leq -Vth2 \quad (2)$$

It should be noted that the threshold values Vth2, −Vth2 are set to the movement speed in the vertical direction at which the user who holds the air pressure measurement unit 1 can be deemed as ascending or descending in an elevator, and, for example, the threshold values Vth2, −Vth2 are set in accordance with the average descend-ascend speed of the elevators.

FIG. 5 does not describe the variables Lup and Ldown and the means for calculating the variables Lup and Ldown when V(t)≥Vth2 holds or V(t)≤−Vth2 holds, but it is possible to more accurately identify as to whether the user is moving in the elevator or not by performing the vertical direction continuous distance calculation in accordance with the same method as the method shown below. On the contrary, as described above, the speed in the vertical direction of the elevator is greatly different from the speed in the vertical direction on the escalator or the stairs are, and therefore, the vertical direction continuous distance calculation may be omitted, and it may be identified as to whether or not the user is moving in the elevator with only the speed in the vertical direction.

On the other hand, in a case where the absolute value of the speed in the vertical direction V(t) is small, that is, the speed in the vertical direction V(t) is extremely slow, the user is considered to be in the flat walking or stationary state. The case where the fluctuation of the air pressure is small also corresponds to the case where the absolute value of the speed in the vertical direction V(t) is small. When this is expressed as a numerical expression, as described above, the definition can be made as shown in the following (7) and (8).

$$\text{Flat walking: } -Vth1 \leq V(t) \leq Vth1 \quad (7)$$

$$\text{Stationary: } -Vth1 \leq V(t) \leq Vth1 \quad (8)$$

It should be noted that the threshold value Vth1 is a value satisfying 0<Vth1<Vth2, and is set to a value at which the user who holds the air pressure measurement unit 1 can be deemed as being in the flat walking or stationary state. The threshold value Vth1 is set on the basis of, for example, the speed in the vertical direction caused by the fluctuation of the air pressure or the speed in the vertical direction and the like during the flat walking.

In this case, when the speed in the vertical direction V(t) is determined, and the user who holds the air pressure measurement unit 1 is determined to be in the flat walking or stationary state, then, the variables Lup and Ldown are cleared and set to 0 (zero) at this point in time (steps S5, S6). That is, this point in time is preferably adopted as the departure point of the vertical direction movement distance. This is because, at this point in time, the person is clearly not moving in the vertical direction.

Finally, there may be a case where the absolute value of the speed in the vertical direction V(t) is a middle value, that is, there may be a case where the speed in the vertical direction V(t) is neither fast nor slow. This may be, as explained in FIG. 4 explained above, the movement in the vertical direction, or may be caused by the fluctuation of the air pressure. When this is expressed as a numerical expression, as explained above, the definition can be made as shown in the following (3), (4), (5), (6).

Escalator ascend: $Vth1 < V(t) < Vth2$ (3)

Escalator descend: $-Vth2 < V(t) < -Vth1$ (4)

Stairs ascend: $Vth1 < V(t) < Vth2$ (5)

Stairs descend: $-Vth2 < V(t) < -Vth1$ (6)

These (3) to (6) can also be paraphrased into the following (3') or (4').

During vertical direction ascend, or fluctuation of the air pressure: $Vth1 < V(t) < Vth2$ (3')

During vertical direction descend, or fluctuation of the air pressure: $-Vth2 < V(t) < -Vth1$ (4')

For example, in a case where the speed in the vertical direction V(t) corresponds to (3'), the variables Lup and Ldown are calculated as follows (step S7).

$Lup = Lup + V(t) * \Delta t$ $Ldown = 0$

That is, the variable Lup is obtained by adding "V(t)*Δt" to the value of the variable Lup that is already held. "Δt" in the second term "V(t)*Δt" is a value newly defined here, and is preferably a cycle (a time per each measurement) of each air pressure value measurement (or each calculation of V(t)). This is because the amount "V(t)*Δt" is a value expressing the distance in which the person moves in this time of "Δt".

Therefore, the amount of the variable Lup is calculated as described above, so that the amount of the variable Lup becomes an extremely useful physical amount indicating how much distance the person is moving in the upward direction in the vertical direction, and that, the amount of the variable Lup becomes an extremely useful physical amount indicating the continuous movement distance. The variable Ldown expresses a continuous movement distance to the lower side, and in (3'), the speed in the vertical direction V(t) is a positive value during the vertical direction ascend, or is a value predicted to be the fluctuation of the air pressure, and therefore, the variable Ldown is preferably cleared and set to zero.

On the other hand, in a case where the speed in the vertical direction V(t) corresponds to (4'), the variables Lup and Ldown are calculated as follows (step S8).

$Lup = 0$ $Ldown = Ldown + V(t) * \Delta t$

At this occasion, the speed in the vertical direction V(t) is a negative value, and therefore, the variable Ldown defined as shown in the above expression is also a negative value at all times. The physical meaning of Ldown can be interpreted almost the same manner as the case of the variable Lup explained above, and is a physical amount indicating how much distance the person is continuously moving to the lower side in the vertical direction.

The various kinds of calculations explained above in the case where the absolute value of the speed in the vertical direction V(t) is a middle value, are executed by the vertical direction continuous distance calculation unit 4. Then, the final discrimination is made by the vertical direction movement determination unit 5. More specifically, this is as follows.

In a case where the speed in the vertical direction V(t) corresponds to (3'), the variable Lup is a physical amount indicating how much distance the person is continuously moving to the upper side in the vertical direction, and therefore, whether the person is ascending in the vertical direction or the fluctuation of the air pressure is caused can be distinguished by determining whether this variable Lup has attained the floor height or not.

In this case, although the floor height is somewhat different depending on a high building or a structure, the floor height is about 4 m (about 3.5 to 4.5 m) in the case of the high building, and the floor height of a vaulted floor is a little bit higher and is about 5 m in most cases. The floor height always is at least higher than about 1.6 to 1.7 m which is the height of a person, and it can be said that the floor height is almost never less than 2.5 m.

Therefore, when the variable Lup is a value larger than 2.5 m, this is considered to mean that the person is continuously moving to the upper side in the vertical direction by a floor height, that is, a height of one floor or higher, and a discrimination result indicating that the person is ascending on an escalator or stairs is given (steps S9, S10). On the contrary, when the variable Lup is a value less than 2.5 m, a discrimination result indicating flat walking or stationary state is given (steps S9, S6). In this case, the threshold value Lth of FIG. 5 may be set to 2.5 m. It should be noted that this threshold value Lth corresponds to the movement distance threshold value.

This is also the same in a case where the speed in the vertical direction V(t) corresponds to (4'). When the variable Ldown is a value less than the threshold value "−Lth", the person may be determined to be descending on an escalator or stairs (step S11, S12), and when the variable Ldown is a value more than the threshold value "−Lth", a discrimination result indicating flat walking or stationary state may be given (step S11, S6).

As is clear from the definition of the variables Lup and Ldown explained above, basically, the variable Lup monotonically increases with a positive value, and the variable Ldown monotonically decreases with a negative value (the absolute value monotonically increases), and a case where this is not satisfied is always only when the variables Lup and Ldown are cleared and set to zero. Therefore, the variables Lup and Ldown go with the following flow as a result of the discrimination according to this method.

(a) During flat walking or stationary, variable Lup=0

(b) When a moving object having an air pressure-type altimeter ascends on an escalator from the state of flat walking or stationary state, the variable Lup begins to monotonically increase, but Lup<Lth holds immediately after the ascend, and therefore, the discrimination result is in flat walking or stationary state.

(c) A little bit before reaching the floor immediately above, the variable Lup satisfies Lup>Lth, and the discrimination result indicates an escalator or stairs.

(d) When the moving object ascends again on an escalator after the moving object reaches the floor immediately above, Lup>Lth already holds, and therefore, the discrimination result still indicates an escalator or stairs, which is the same state as the state of (c), and this state continues.

(e) When the moving object performs flat walking after reaching the floor immediately above, Lup becomes zero when the speed in the vertical direction V(t) becomes equal to or less than Vth1, and the moving object returns back to the state of (a).

The flow during the descend with the variable Ldown in a case where the moving object descends on an escalator is also the same.

As explained above, not only the speed in the vertical direction but also the movement distance in the vertical direction are calculated from a time change of air pressure value data, and how the barometer (the user who holds the air pressure measurement unit 1) is moving is determined on the basis of both of the speed in the vertical direction and the movement distance. Therefore, whether or not the change in the air pressure is caused by a change in the altitude or the movement in the vertical direction can be appropriately identified. That is, whether the moving object is moving on an escalator (or stairs) or in a state of flat walking or stationary state can also be appropriately identified, which was difficult to be identified with only the speed in the vertical direction.

In particular, the speed in the vertical direction of moving equipment used for movement in the vertical direction vary relatively greatly even in the same type of moving equipment such as an escalator in a hospital, an escalator in a station, or the like, which have been explained above, and in addition, data such as a movement speed of an escalator for each of the moving equipment are difficult to be obtained. Therefore, in a case where the threshold value of the speed in the vertical direction is set for each type of moving equipment such as an escalator and an elevator, and the moving equipment is identified on the basis thereof, the determination error increases.

However, by calculating the continuous distance in a case where the moving object moves in the vertical direction as explained above, it is possible to directly compare the continuous distance with the height of each floor of a high building and the like (floor height). Then, this floor height has a relatively small variation between different buildings, and further, data such as the floor height can be relatively easily obtained. Therefore, whether or not the air pressure change is caused by a change in the altitude or movement in the vertical direction can be automatically identified in an easy and accurate manner.

Therefore, when the air pressure change is identified to be caused by a factor except an altitude change or movement in the vertical direction such as movement on an escalator or stairs and movement on an elevator from an air pressure measurement value with an air pressure-type altimeter or the like, then, this air pressure change is not caused by an altitude change or movement in the vertical direction, and processing such as correction of the altitude is performed, whereby the altitude can be automatically corrected, and an air pressure-type altimeter that is more easy to use can be realized.

Figure 6:
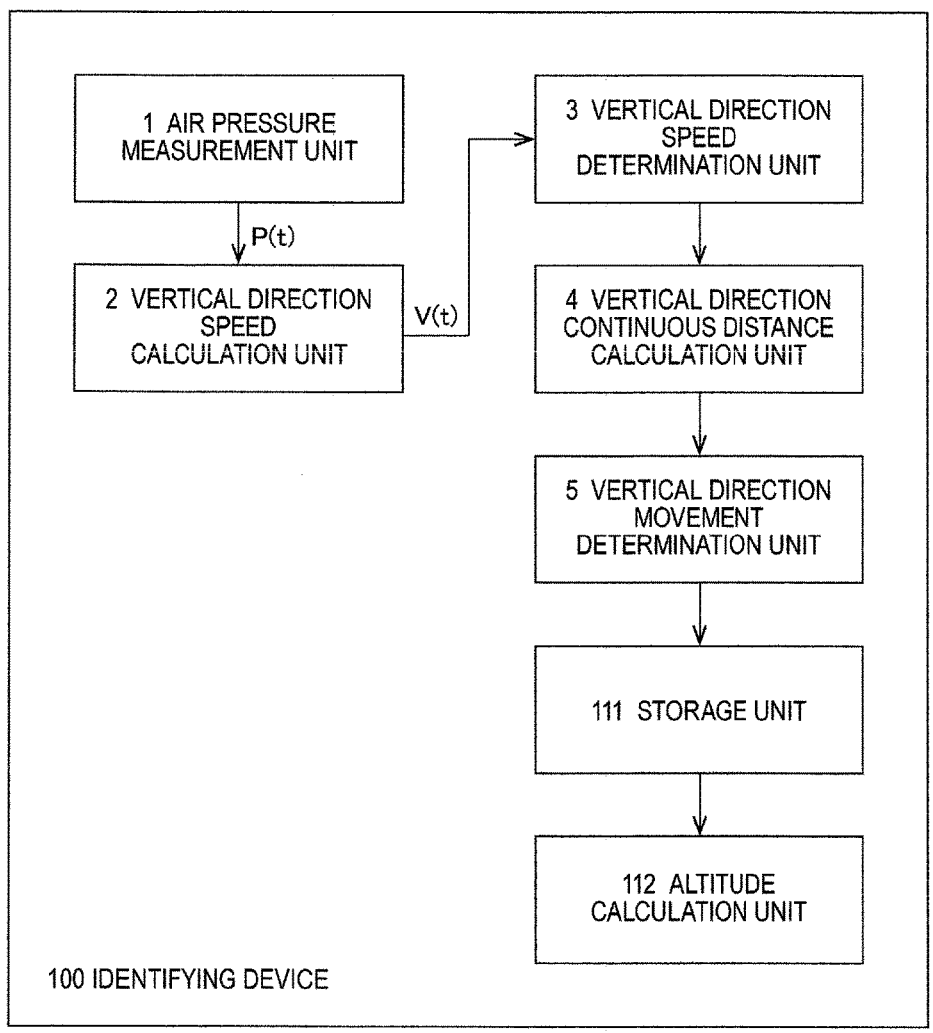
FIG. 6 is a block diagram illustrating another example of a configuration of the identifying device according to the present invention.

For example, when the change in the air pressure is determined not to be caused by movement in the vertical direction, that is, in a case where the moving object is determined to be performing the flat walking or in the stationary state, an air pressure value P which is a measurement value of the air pressure at this point in time is set as the reference air pressure value of the reference of the vertical direction height as shown in FIG. 6, and for example, this reference air pressure value and the already-known altitude or floor are associated with each other and stored to a storage unit 111, and the altitude can be appropriately estimated by estimating the altitude with the altitude calculation unit 112 by using the reference air pressure value stored in the storage unit 111 as the reference. At this occasion, by correcting the reference air pressure value stored in the storage unit 111 by using the air pressure value P, for example, by updating the reference air pressure value stored in the storage unit 111 with the air pressure value P in a period when it is determined that the change in the air pressure is not caused by movement in the vertical direction, that is, the user is performing the flat walking or in the stationary state and is not moving in the vertical direction, it is possible to estimate the altitude more appropriately.

Figure 7:
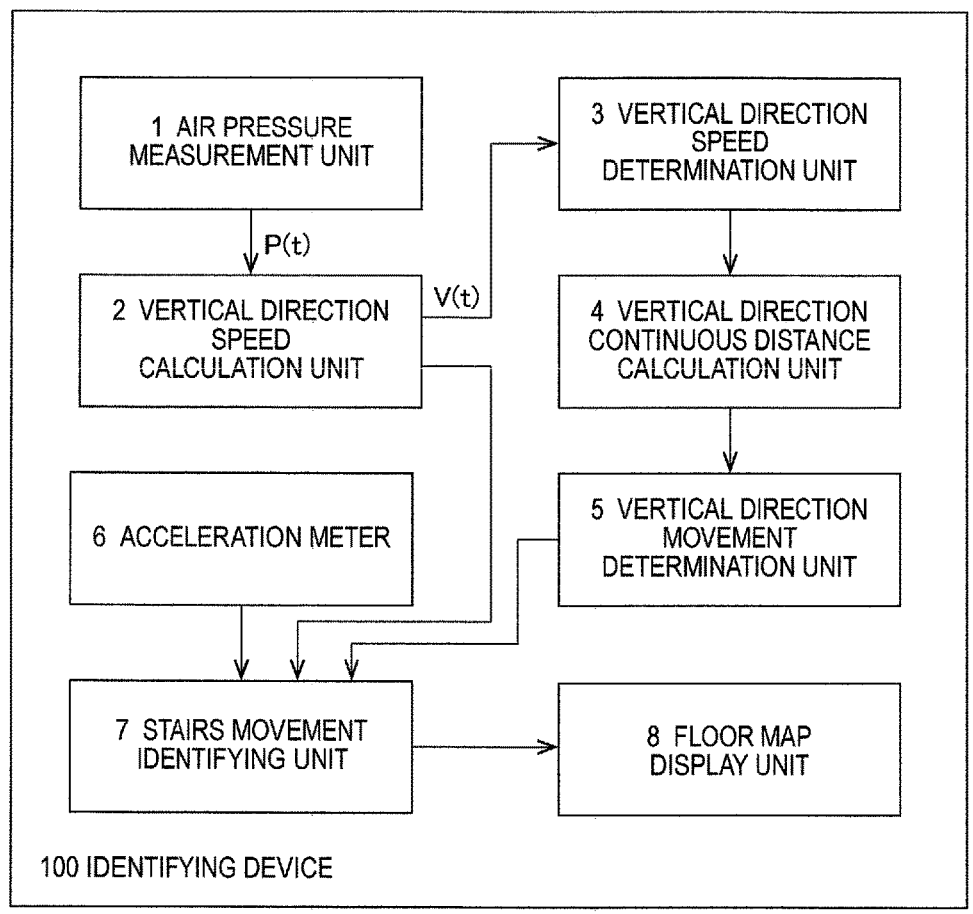
FIG. 7 is a block diagram illustrating another example of a configuration of the identifying device according to the present invention.
Figure 7:
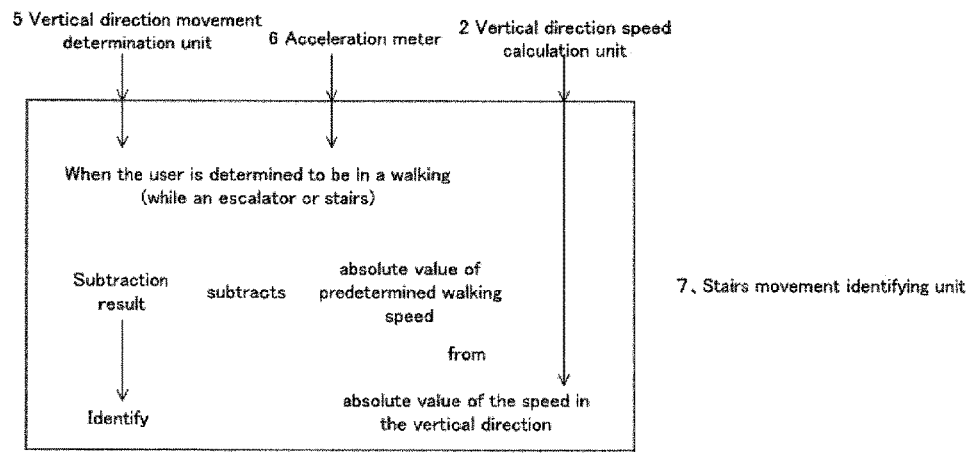

As shown in FIG. 7, when the identifying device according to the present invention is further provided with an acceleration meter 6 (acceleration sensor), it is possible to find whether the user is in the state of walking or the user is not walking and is in the stationary state. By using this, an escalator and stairs that could not be distinguished in the above explanation can be distinguished. More specifically, the following means may be used.

In the above explanation, in a case where a discrimination result indicating that the user who holds the air pressure measurement unit 1 is moving by using an escalator or stairs is given, the actual state of the user is possibly either walking on an escalator, in a stationary state on an escalator, or walking on stairs.

First, in a case where the measurement value of the acceleration meter 6 is substantially zero, and the state is determined not to be in the walking state (the state is in the stationary state), the user can be clearly deemed to be stationary on an escalator.

The remaining two are distinguished by using the fact that the step of an escalator and the step of a stair are almost the same in general, and the speed in the vertical direction in a case where the user walks on the escalator and the speed in the vertical direction in a case where the user descends and ascends the stairs are also about the same. More specifically, when the previously determined speeds in the vertical direction during walking that are caused in cases where the user walks on an escalator and the user descends and ascends the stairs are subtracted from the speed in the vertical direction V(t) calculated by the vertical direction speed calculation unit 2, the numerical value obtained by the subtraction is almost the speed in the vertical direction of the escalator itself (which is larger than zero) when the user walks on the escalator, the numerical value obtained by the subtraction is close to zero speed in the vertical direction when the user walks on the stairs. A certain threshold value is set on the basis of this magnitude relationship, and when the numerical value obtained by the subtraction is more than the threshold value, the user may be identified to be walking on the escalator, when the numerical value obtained from the subtraction is less than the threshold value, the user may be identified to be walking on the stairs. The discrimination as to whether the user is in the stationary state on the escalator, the state of walking on the escalator, and the state of descending or ascending the stairs may be made by the stairs movement identifying unit 7 as shown in FIG. 7. More specifically, the result of the determination made by the vertical direction movement determination unit 5, the measurement value of the acceleration meter 6, and the speed in the vertical direction V(t) calculated by the vertical direction speed calculation unit 2 are input into the stairs movement identifying unit 7. When the user is determined to be moving on the escalator or is determined to be descending or ascending the stairs as a result of the determination of the vertical direction movement determination unit 5, the stairs movement identifying unit 7 determines whether the user is not in the walking state (the user is in the stationary state) from the measurement value of the acceleration meter 6. When the user is determined to be in the walking state, the previously determined speeds in the vertical direction during walking that are caused in cases where the user walks on the escalator and the user descends and ascends or stairs may be subtracted from the speed in the vertical direction V(t) calculated by the vertical direction speed calculation unit 2, and the determination may be made on the basis of the subtraction results.

Finally, for example, when the identifying device according to the present invention is used to identify the elevator movement, it is possible to know that the user is in the elevator, and in addition, the time when the user took the elevator and the time when the user gets off the elevator can be known instantly, with an instability of about as much as several seconds specifically.

On the other hand, there are not many elevators in a high building, and moreover, the locations of the elevators can be easily found from an indoor map (floor map) and the like. Therefore, for example, as shown in FIG. 7, the identifying device 100 is provided with a floor map display unit 8 for displaying a floor map of a floor where the user is located. Then, when the discrimination result of the current state of the user provided by the identifying device 100 is used, for example, it can be known that the user is the entrance of the elevator as soon as the user gets off the elevator, and therefore, as soon as the user is determined to have gotten off the elevator, the current location of the user on the floor map can be coordinated with the location in proximity to the elevator on the floor map. Further, the movement direction at the entrance of the elevator (the azimuth in which the user who holds the identifying device 100 is walking) is known in some cases. As a result, it is possible to coordinate a moving direction (azimuth) of the user at the current location on the floor map with the known moving direction. This technique is an extremely useful measure for accumulative error correction and the like of the autonomous navigation in the indoors.

Figure 8:
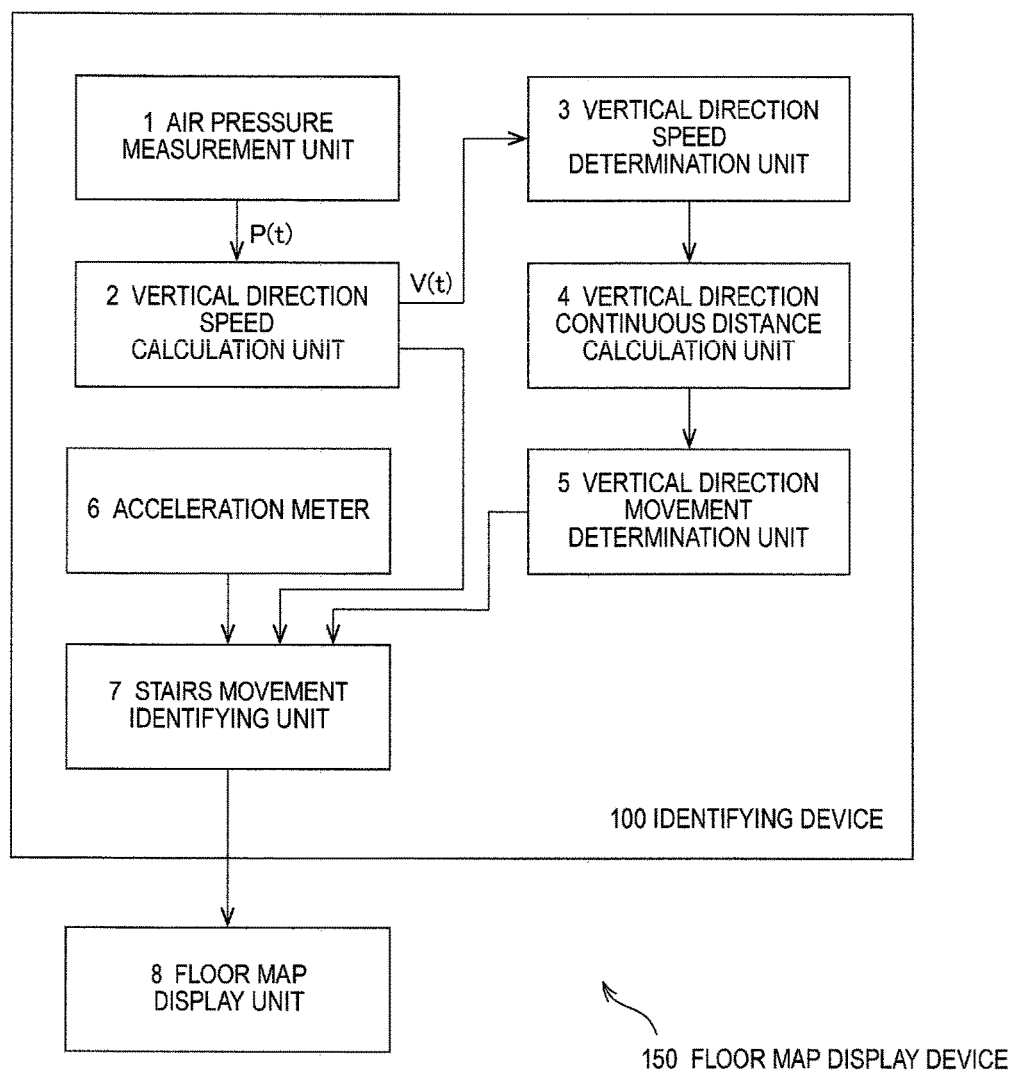
FIG. 8 is a block diagram illustrating an example of a configuration of a floor map display device to which the identifying device according to the present invention is applied.

In FIG. 7, the case where the floor map display unit 8 is provided in the identifying device 100 has been explained, but the embodiment is not limited thereto, and as shown in FIG. 8, an identifying device 100 is further provided in the floor map display device 150 having the floor map display unit 8, and can be configured to coordinate the current location, the movement direction, and the like of the user on the floor map with actual ones.

According to an aspect of the present invention, not only the speed in the vertical direction but also the continuous movement distance of the air pressure measurement unit are calculated from the time change of the air pressure measurement value, and therefore, whether or not the air pressure change is caused by the change in the altitude or the movement in the vertical direction can be identified in an accurate and automatic manner.

It is to be understood that the completely the same means is used to make correction even in the case of the escalator and the stairs.

It should be noted that the scope of the present invention is not limited to an exemplary embodiment described in the drawings, and includes all the embodiments that achieve the effects equivalent to the object of the present invention. Further, the scope of the present invention can be defined by all the desired combinations of particular features of all the disclosed features.

REFERENCE SIGNS LIST

1 air pressure measurement unit
2 vertical direction speed calculation unit
3 vertical direction speed determination unit
4 vertical direction continuous distance calculation unit
5 vertical direction movement determination unit
6 acceleration meter
7 stairs movement identifying unit
8 floor map display unit
100 identifying device

The invention claimed is:

1. A device for identifying a change in a vertical direction by using an air pressure measurement value, the device comprising:
   an air pressure measurement unit configured to measure an air pressure;
   a speed calculation unit configured to calculate a speed in a vertical direction of the air pressure measurement unit based on an air pressure measurement value measured by the air pressure measurement unit;
   a continuous movement distance calculation unit configured to calculate a continuous movement distance in the vertical direction of the air pressure measurement unit based on the speed in the vertical direction obtained by the speed calculation unit;
   a vertical direction movement determination unit configured to determine that the air pressure measurement unit moves in the vertical direction based on the speed in the vertical direction and the continuous movement distance calculated by the continuous movement distance calculation unit; and
   a floor map display unit configured to display a floor map of a floor where a user holding the air pressure measurement unit is located,
   wherein the floor map display unit is configured to coordinate a current location of the user with a location of moving equipment on the floor map that is identified to be used to move by the user, or to coordinate a movement direction of the user with the location of the moving equipment on the floor map.

2. The device for identifying the change in the vertical direction by using the air pressure measurement value according to claim 1, wherein
   the device comprises a vertical direction speed determination unit configured to determine whether or not the speed in the vertical direction is more than a speed threshold value which is set beforehand, and the vertical direction movement determination unit is configured to determine that the air pressure measurement unit moves in the vertical direction when the vertical direction speed determination unit determines that an absolute value of the speed in the vertical direction is more than the speed threshold value and an absolute value of the continuous movement distance calculated by the continuous movement distance calculation unit is more than a movement distance threshold value which is set beforehand, and the vertical direction movement determination unit is configured not to determine that the air pressure measurement unit moves in the vertical direction when the vertical direction speed determination unit determines that the absolute value of the speed in the vertical direction is more than the speed threshold value and the absolute value of the continuous movement distance is not more than the movement distance threshold value.

3. The device for identifying the change in the vertical direction by using the air pressure measurement value according to claim 2, wherein the vertical direction movement determination unit is configured to determine that the air pressure measurement unit is not moving in the vertical direction when it is determined that the absolute value of the speed in the vertical direction is more than the speed threshold value and the absolute value of the continuous movement distance is not more than the movement distance threshold value.

4. The device for identifying the change in the vertical direction by using the air pressure measurement value according to claim 3, wherein the continuous movement distance calculation unit is configured to calculate the continuous movement distance by integrating movement amounts of the air pressure measurement unit per unit time based on the speed in the vertical direction while the absolute value of the speed in the vertical direction is more than the speed threshold value, and to reset the continuous movement distance is reset to zero while the absolute value of the speed in the vertical direction is not more than the speed threshold value.

5. The device for identifying the change in the vertical direction by using the air pressure measurement value according to claim 1, wherein the vertical direction movement determination unit is configured to determine whether or not the air pressure measurement unit moves in the vertical direction based on the speed in the vertical direction and the continuous movement distance.

6. The device for identifying the change in the vertical direction by using the air pressure measurement value according to claim 5, wherein the device comprises a vertical direction speed determination unit configured to determine whether or not the speed in the vertical direction is more than a speed threshold value which is set beforehand, and the vertical direction movement determination unit is configured to determine that the air pressure measurement unit moves in the vertical direction when the vertical direction speed determination unit determines that an absolute value of the speed in the vertical direction is more than the speed threshold value and an absolute value of the continuous movement distance calculated by the continuous movement distance calculation unit is more than a movement distance threshold value which is set beforehand, and the vertical direction movement determination unit is configured to determine that the air pressure measurement unit does not move in the vertical direction when the vertical direction speed determination unit determines that the absolute value of the speed in the vertical direction is more than the speed threshold value and the absolute value of the continuous movement distance is not more than the movement distance threshold value.

7. The device for identifying the change in the vertical direction by using the air pressure measurement value according to claim 1, the device further comprising:

an altitude calculation unit configured to perform altitude calculation based on the air pressure measurement value; and a storage unit in which a reference air pressure at a predetermined altitude or floor used when the altitude calculation unit performs the altitude calculation is stored, wherein the reference air pressure stored in the storage unit is corrected based on the air pressure measurement value while the air pressure measurement unit is determined not to be moving in the vertical direction.

8. The device for identifying the change in the vertical direction by using the air pressure measurement value according to claim 1, wherein it is identified which of an elevator, an escalator, or stairs is the moving equipment used to move the air pressure measurement unit based on the speed in the vertical direction, while the vertical direction movement determination unit determines that the air pressure measurement unit is moving in the vertical direction.

9. The device for identifying the change in the vertical direction by using the air pressure measurement value according to claim 8, the device further comprising an acceleration meter configured to measure an acceleration in the vertical direction, wherein while the vertical direction movement determination unit determines the moving equipment used to move the air pressure measurement unit is an escalator or stairs, it is identified which of a state of walking on a moving escalator, a state of being stationary on a moving escalator, and a state of descending or ascending stairs, the user is in, based on the speed in the vertical direction and the acceleration measured by the acceleration meter.

10. The device for identifying the change in the vertical direction by using the air pressure measurement value according to claim 9, the device further comprising a stairs movement identifying unit configured to identify that the user is in a stationary state on a moving escalator when the user is determined not to be in a walking state based on the acceleration measured by the acceleration meter, and to subtract from an absolute value of the speed in the vertical direction calculated by the speed calculation unit, an absolute value of a predetermined walking speed in the vertical direction corresponding to a speed in the vertical direction that is caused in a case where the user walks on an escalator or descends or ascends stairs when the user is determined to be in a walking state based on the acceleration, wherein the stairs movement identifying unit is configured to identify that the user is in a state of walking on a moving escalator when a subtraction result obtained by subtracting the absolute value of the walking speed in the vertical direction from the absolute value of the speed in the vertical direction is more than a threshold value which is set beforehand, and to identify that the user is descending or ascending stairs, when the subtraction result is equal to or less than the threshold value.

11. A floor map display device comprising:
an air pressure-type vertical direction movement identifying device including:
   an air pressure sensor configured to output an air pressure signal;
   a vertical direction speed signal output unit configured to input the air pressure signal, and to output a first signal indicating a speed in a vertical direction of the air pressure sensor;
   a vertical direction movement distance signal output unit configured to input the first signal, and to output a second signal indicating a continuous movement distance in the vertical direction of the air pressure sensor; and
   a vertical direction movement signal output unit configured to input the first signal and the second signal, and to output a third signal indicating that the air pressure sensor moves in the vertical direction; and
a floor map display unit configured to display a floor map of a floor where a user is located, based on the third signal,
wherein the third signal indicates that moving equipment used to move the air pressure sensor is an escalator or stairs.

12. The floor map display device according to claim 11, wherein the vertical direction movement signal output unit is configured to further output a fourth signal indicating that the moving equipment is an elevator.

13. The floor map display device according to claim 12 wherein the floor map display unit configured to display the floor map based on the third signal and the fourth signal.

14. The floor map display device according to claim 13, wherein the floor map display unit is configured to coordinate a current location of the user with a location of the moving equipment on the floor map, which is one of the elevator, the escalator, and the stairs, that is determined to be used to move by the user, or to coordinate a movement direction of the user with the location of the moving equipment on the floor map.

* * * * *